E. C. MEYER.
CAMERA.
APPLICATION FILED AUG. 14, 1916.
1,275,965.
Patented Aug. 13, 1918.
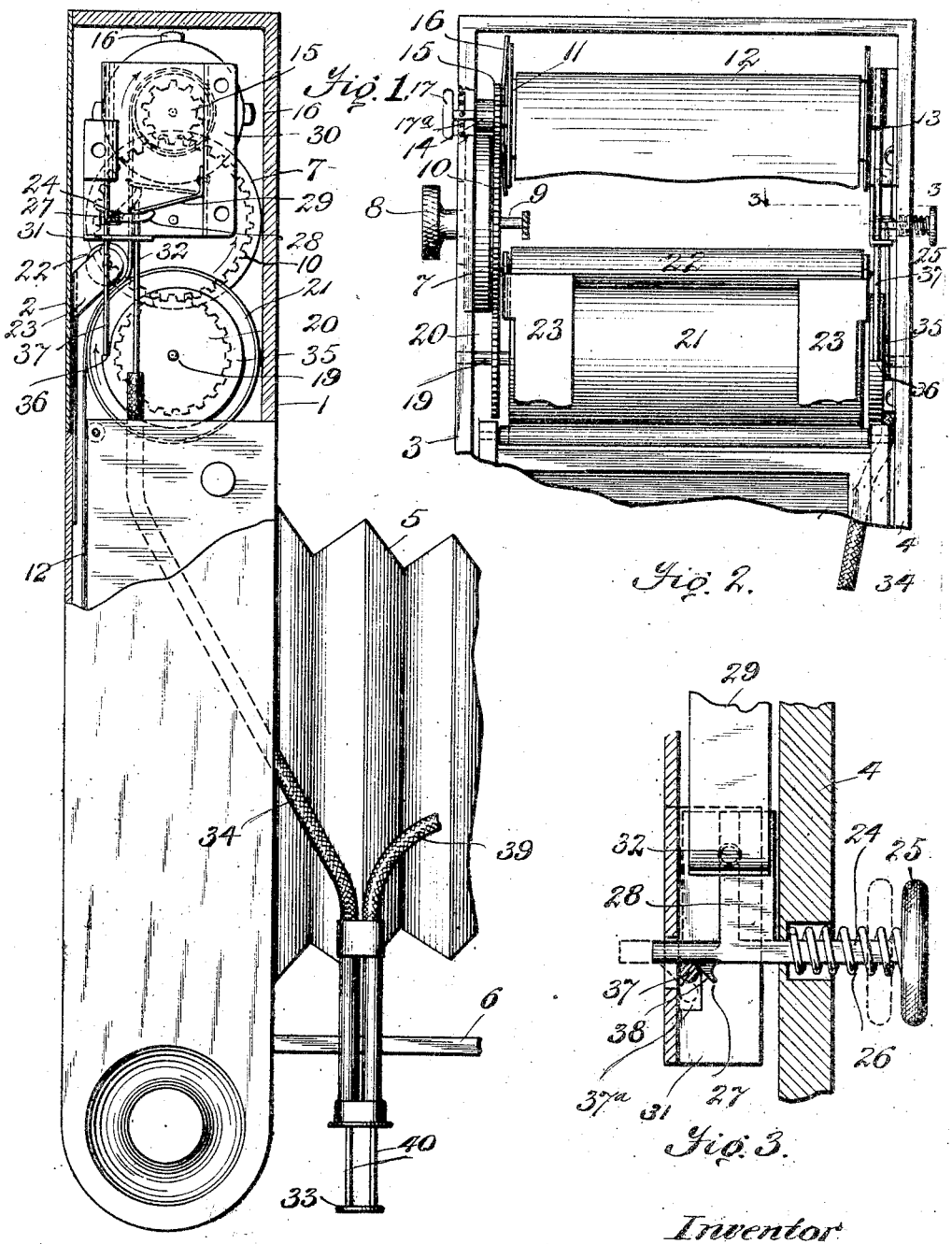
Inventor
Edwin C. Meyer,
by W. S. Duvall,
Attorney.

UNITED STATES PATENT OFFICE.

EDWIN C. MEYER, OF THANE, TERRITORY OF ALASKA.

CAMERA.

1,275,965.   Specification of Letters Patent.   Patented Aug. 13, 1918.

Application filed August 14, 1916. Serial No. 114,737.

*To all whom it may concern:*

Be it known that I, EDWIN C. MEYER, a citizen of the United States, residing at Thane, in the precinct of Juneau and Territory of Alaska, have invented a new and useful Camera, of which the following is a specification.

My invention is an improvement in cameras, and relates more especially to that particular class in which the negatives are produced on a flexible strip of material or film which is wound from one roll to another in taking the exposures.

The principal object of the invention is to embody in this particular type of camera a very simple and inexpensive mechanism, so constructed and arranged that there is little likelihood, if any, of spoiling a part of the film-strip by reason of a second exposure thereon, or, of "skipping" portions or sections of the film-strip. This I accomplish by means of a mechanism that will plainly indicate when a fresh or unexposed portion of the film-strip is in position for exposure, and which will operate automatically to indicate that an exposure has been made the instant the camera-shutter has been operated, thus notifying the operator of the prevailing condition in a very plain and positive manner and not merely leaving it to conjecture on his part.

Other objects and advantages of the invention will hereinafter appear, and the novel features of the invention will be particularly pointed out in the claims.

Referring to the drawing:

Figure 1 is a side elevation of a conventional type of film camera, open for use, but with the bellows partly broken away and the upper portion of the side-wall removed so as to expose the interior construction, including my improvements applied thereto;

Fig. 2 is a rear elevation, of the upper portion of the camera, the back wall being removed; and, Fig. 3 is an enlarged sectional view taken on the line 3—3 of Fig. 2, and illustrating the film-operating mechanism.

Similar numerals of reference indicate similar parts in all the figures of the drawing.

For the purpose of illustrating the application of my invention, I have shown the same in connection with the conventional type of pocket film camera—wherein 1 designates the front-wall; 2 the removable back-wall; 3 and 4 the opposite side-walls; 5 the bellows; and 6 the bellows and lens-support; all being of the usual construction and forming no part of my invention.

7 designates a spring-motor, and being of the usual well-known construction, it is provided with the ordinary type of pawl and ratchet escapement (not shown). Through the medium of a key or turn-button 8, the spring of the motor may be wound or tightened within the drum. This spring is wound about an arbor or shaft 9, and upon the latter is a drive-gear 10. Above the spring-motor, which it will be understood, is secured to the side-wall 3 of the camera, is located means for supporting the film receiving spool or roll 11, about which is wound as the exposures are made, the usual film-strip 12. This spool or roll is both yieldingly as well as rotatably supported in the upper end of the camera case where it is capable of removal in the usual manner. One end of the spool or roll may have its axis let into a slight indentation formed in the spring-plate 13, while its opposite axis is entered in the inner end of a hollow fixed stub-shaft 14, extending inwardly from the opposite side-wall 3 of the camera. Mounted on the inner end of this hollow stub-shaft is a gear 15, in mesh with the driving-gear 10 of the spring-motor, so as to be turned thereby, said gear 15 being loosely mounted in position, and at the inner side of the same is located a series of radiating spring-tension fingers 16, against which the adjacent flanged end of the roll or spool may bear. The spool or roll will thus be held frictionally in position, and while it will be turned by the gear 15 when the latter is rotated, yet it is also capable of slipping when the film-strip becomes sufficiently tight, and in this way, as will hereinafter appear, I am enabled to compensate for variations in the diameter of the film roll as the film-strip is wound thereon.

A key 17, may be inserted externally through the hollow stub-shaft, and at its inner end serve as a bearing for the spool or roll, such key being employed for manually turning said spool or roll for the purpose of winding thereon the remainder of the film after the same has been completely used up by exposures. The key may have its inner end notched or bifurcated, as at 18, such bifurcations being designed to removably engage with corresponding indentations formed in the flange of the spool or roll. This key is normally held in engagement with the spool by means of a light spring 17a, but is capable of being withdrawn so as to disengage its inner end from the spool or roll, whereby the latter may be removed. Below the spring-motor, and, therefore, at an intermediary point between the two film spools, there is journaled in the opposite side-walls 3 and 4 of the camera, a transverse feed-shaft 19. This shaft is provided with a gear 20, which meshes with and is driven by the drive-gear of the motor-shaft, and it also carries a feed-roll 21, the surface of which, it will be understood, is covered with some suitable friction material. The diameter of this feed-roll is such that it will, at each revolution, feed the film the distance of one exposure; and therefore, may be varied as is evident will be necessary in different cameras. So, also, are the gears between the shaft 19 and the stub-shaft 14, made in proper ratio.

Bearing upon the feed-roll 21, and operating therefore upon the film-strip 12, is an idle tension-roll 22, the axes of which are supported by arms 23, extending from the back wall of the camera case.

In a suitable opening formed in the wall 4 of the camera-case, is mounted for reciprocation as well as oscillation, a short plunger-shaft 24, the shaft being capable of being reciprocated by means of a button or head 25, at its outer end. About the plunger-shaft and between the head or button 25 thereof and the bottom of a depression in the wall of the camera case, is a coiled spring 26, the tendency of which is to normally force the shaft and button outward from the case. The plunger-shaft is provided near its inner end at one side with a cam-projection 27, and at its opposite side with a radial rock-arm 28. A flat spring 29, projecting from the partition 30, bears at its free end against the upper side of the rock-arm and serves to normally depress the same to a horizontal position, thereby maintaining the cam-projection 27 at the opposite side of the plunger in a similar though oppositely disposed position.

Extending upwardly through an opening in a guide-plate 31, formed by the bent lower end of the partition-plate 30, is a reciprocating releasing-rod 32, the upper end of which bears against the underside and near the free end of the rock-arm 28. This releasing-rod is operated through the medium of a cable 34, leading to the exterior of the camera-case, at the outer end of which is a push-button 33.

On the shaft 19 carrying the feed-roll 21, and at that end opposite which the gear 20 is located, is mounted a locking-cam 35, formed with a single locking-shoulder 36. Normally engaging with this shoulder, and, therefore, serving to lock the feed-roll and its shaft against rotation by the spring-motor, is a resilient locking-rod or vibratory pawl 37, the upper end of which may be secured to any suitable point of the frame. This locking-rod or pawl depends through an opening 37a, formed in the guide-plate 31, alongside of and transverse to the plunger-shaft, and at its lower end engages with the locking shoulder of the locking-cam 35, as shown. It will be evident that when the plunger is pushed inward, its cam-projection 27, the advance side of which is inclined, as at 38, will force the free end of the locking-rod or pawl away from the locking-cam so as to free the latter and permit the feed-roll to make one revolution, being actuated thereby by the spring-motor and intermediate gears. This unlocking of the feed-roll is only during the passage of the cam-projection 27 by the releasing-rod or pawl, so that as soon as said cam-projection has passed said pawl the latter springs back into the path of the shoulder of the locking-cam and arrests further rotation of the same and the feed-roll. It will be evident that if the feed-roll is properly proportioned, it will serve to advance the film-strip the distance of one exposure, and therefore render a second exposure impossible. This unlocking of the feed-roll also serves to unlock the spring-motor and the latter thereupon drives the upper film-spool or roll sufficiently to take up the film or portion of the film-strip thus advanced. When the cam-projection 27 has passed by and operated the locking-rod, its opposite side will engage the rod, so that the latter will bar the return of the plunger to its outer position until these parts are released.

The shutter operating cable 39, is preferably operated through the same push-button, 33, heretofore mentioned as employed for operating the releasing-mechanism. For this purpose the said button is formed with twin stems or shanks 40, one operating in the releasing-cable 34 and the other in the shutter operating cable 39. It will be seen that by this arrangement, when the button 33 is pressed, not only will the shutter be operated and an exposure made, but the releasing-rod 32 will be forced upward against the rock-arm 28, elevate the same and rock or partially rotate the plunger-shaft 24, thus serving to tilt the cam projection 27 sufficiently to disengage the same from the locking-rod or pawl 37, and permit the plunger-shaft to move outward under the influence of the coiled spring 26. As soon as the arm 28 is relieved from the upward pressure of the releasing-rod, the spring 29 serves to depress the same to its normal horizontal position, and, in doing so, reëlevate the cam-projection so that it again lies transverse the locking-rod or in operative relation thereto.

The remainder of the camera, it will be understood, is of the usual construction of film cameras, and, as therein, the film strip 12, passes from the lower delivery-roll (not shown) to the upper receiving roll, the intermediate part of said film-strip passes partly about the feed-roll 21, against the friction surface of which it is held by the tension-roll 22.

Assuming a new film strip or roll of film to be in place with the zero visible through the sight-opening of the camera, the first unexposed portion of the film-strip is now brought into position by pushing the plunger-shaft 24 inwardly, which operates the mechanism in the manner heretofore described to advance said film-strip until said portion No. 1 is back of the lens. A portion of the film-strip being in position for exposure, it will be observed that the plunger operating button 25 is held pushed inward or in locked position. The twin-button 33 now being operated, the exposure is made, and at the same time the releasing-rod 32 is forced upward and, in the manner heretofore described, disconnects the plunger-shaft 24 from the locking-rod or pawl 37 and permits said plunger-shaft and its button 25 to be forced outward by the coiled-spring 26. As will be seen, when the plunger and its button is in the outermost position, such will indicate to the operator that an exposure of that part of the film in line with the lens has been made, so that he will be warned positively of this fact, and therefore not make an accidental second exposure thereon. To bring a second portion of the film-strip, designated No. 2, in position for an exposure, the button 25 is again pressed, and the parts will operate as before to bring said portion No. 2 into the required position. The button 25, it will be seen, is again locked in its retracted or innermost position, and therefore clearly indicates that an unexposed portion of the film-strip is in position to receive an exposure. Being locked in its retracted position, button 25 cannot be again operated until after being released and such release can only take place by the operation of the shutter-mechanism as in taking a picture, so that, skipping films is rendered impossible. At any time, therefore, that the operator observes the plunger and its button 25 are occupying their depressed position, he may be positively assured that the camera is in condition for an exposure, and when occupying their outer positions, he will be just as positively assured that an exposure has been made upon that portion of the film-strip back of the lens and that a fresh portion must be brought into position before the shutter is again operated.

Having described my invention, what I claim, is:

1. The combination with a camera, of a spring-motor therein, motion transmitting means between the same and the receiving roll of the camera, a film feeding means, motion transmitting means between the same and the spring-motor, means for locking said feeding means, means operating to release the locking means and to be engaged thereby, and means for releasing said lock releasing means from such engagement.

2. The combination with a camera, of a spring-motor therein, a film feeding roll, a film receiving roll, gearing between the same and the spring-motor, a shouldered locking-cam on the shaft of the feed roll, a vibratory locking-pawl for engaging said shoulder and locking the feed roll against the influence of the motor, means operating to disengage said pawl from the shoulder of the cam and permit rotation of the feed roll and for interlocking with and being detained by said pawl, and means for disengaging said interlocking parts.

3. The combination with a camera, of a spring-motor therein, a feed roll, gearing between the spring-motor, the feed roll and the receiving roll of the camera, a shouldered locking-cam located on the feed roll shaft, a vibratory pawl for engaging and holding the same, a plunger located in the wall of the camera-case and disposed at an angle to the pawl and having a cam-projection for operating and engaging with the pawl when the plunger is operated, a spring for returning the plunger after its cam-projection is disengaged from the pawl, an arm extending from the plunger opposite the pawl, and means for tilting the plunger through the arm and thereby disconnect the cam-projection from its engagement with the pawl.

4. The combination with a camera, of a spring-motor therein, a feed roll, gearing between the spring-motor, the feed roll and the receiving roll of the camera, a shouldered locking-cam located on the feed roll shaft, a vibrator pawl for engaging and holding the same, a plunger located in the wall of the camera-case and disposed at an angle to the pawl and having a cam-projection for operating and subsequently engaging with the pawl, a return spring for the plunger, means for rotating the plunger to disengage the lug from its locking engagement with the pawl, and means for operating said rotating means.

5. The combination with a camera, of a spring-motor therein, a feed roll, a shouldered cam mounted on the shaft with the same, a vibratory locking-pawl for engaging the shouldered cam, gearing between the feed roll shaft and the spring-motor and between the latter and the receiving roll of the camera, a plunger mounted in the wall of the camera-case and disposed at an angle to the vibratory pawl and provided with a cam-projection adapted to vibrate the pawl and subsequently interlock therewith, a return spring for the plunger, an arm extending from the plunger, a spring for normally depressing the same, a releasing-rod extending under the arm and serving when reciprocated to tilt the arm against the action of its spring for the purpose of disconnecting the cam-faced lug from its engagement with the pawl, and means for reciprocating said rod.

6. The combination with a camera, of a spring-motor therein, a feed roll, a shouldered cam mounted on the shaft with the same, a vibratory spring locking-pawl for engaging the shouldered cam, gearing between the feed roll shaft and the spring-motor and between the latter and the receiving roll of the camera, a plunger mounted in the wall of the camera-case and disposed at an angle to the vibratory pawl and provided with a cam-projection adapted to vibrate the pawl and subsequently at its opposite side interlock therewith, a return-spring for the plunger, an arm extending from the plunger, a spring for normally depressing the same, a releasing-rod extending under the arm and serving when reciprocated to tilt the same against the action of its spring for the purpose of rocking the plunger and disconnecting the cam-projection from locking engagement with said pawl, and an operating cable leading to the releasing-rod.

7. The combination with a camera, of a receiving-roll, a feeding-roll, means for turning said rolls simultaneously, a locking-cam on the feeding-roll, a spring-actuated pawl engaging said locking-cam for limiting the rotation of the feeding-roll, a plunger-rod, and means carried by the latter for releasing the pawl and subsequently engaging therewith to hold said plunger-rod depressed.

8. The combination with a camera, of a receiving-roll, a feeding-roll, means for turning said rolls simultaneously, a locking-cam on the feeding-roll, a spring-actuated pawl engaging said locking-cam for limiting the rotation of the feeding-roll, a spring-projected plunger-rod, means carried by said plunger-rod for releasing the pawl and subsequently engaging therewith to hold the plunger-rod depressed against the action of its spring, and means for releasing the plunger-rod from the pawl.

In testimony whereof I have signed my name to this specification in the presence of two subscribing witnesses.

EDWIN C. MEYER.

In the presence of—
H. VANDER LEEST,
W. B. KIRK.